United States Patent [19]

Romanowski et al.

[11] Patent Number: 4,800,138

[45] Date of Patent: Jan. 24, 1989

[54] SEPARATION OF GASEOUS HYDROGEN FROM A WATER-HYDROGEN MIXTURE IN A FUEL CELL POWER SYSTEM OPERATING IN A WEIGHTLESS ENVIRONMENT

[75] Inventors: William E. Romanowski, Rockville; George T. Suljak, Vernon, both of Conn.

[73] Assignee: International Fuel Cells Corporation, South Windsor, Conn.

[21] Appl. No.: 39,038

[22] Filed: Apr. 16, 1987

[51] Int. Cl.$^4$ .......................... H01M 8/18; B04B 1/00; B04B 11/00
[52] U.S. Cl. .......................................... 429/19; 494/25; 494/35; 494/60; 494/900
[58] Field of Search ...................... 429/19; 494/25, 35, 494/60, 900

[56] References Cited

U.S. PATENT DOCUMENTS

| | | | |
|---|---|---|---|
| 2,144,229 | 1/1939 | Ruda | 494/35 |
| 2,947,472 | 8/1960 | Skarstrom et al. | 494/35 X |
| 3,224,173 | 12/1965 | Webb | 494/900 X |
| 3,276,670 | 10/1966 | Booth | 494/900 X |
| 3,936,214 | 2/1976 | Zupanick | 494/900 X |

Primary Examiner—Stephen J. Kalafut

[57] ABSTRACT

A fuel cell power system for use in a weightless environment, such as in space, includes a device for removing water from a water-hydrogen mixture condensed from the exhaust from the fuel cell power section of the system. Water is removed from the mixture in a centrifugal separator, and is fed into a holding, pressure operated water discharge valve via a Pitot tube. Entrained nondissolved hydrogen is removed from the Pitot tube by a bleed orifice in the Pitot tube before the water reaches the water discharge valve. Water discharged from the valve thus has a substantially reduced hydrogen content.

3 Claims, 2 Drawing Sheets

SEPARATION OF GASEOUS HYDROGEN FROM A WATER-HYDROGEN MIXTURE IN A FUEL CELL POWER SYSTEM OPERATING IN A WEIGHTLESS ENVIRONMENT

The invention described herein was made in the performance of work under NASA Contract and is subject to the provisions of Section 305 of the National Aeronautics and Space Act of 1958 (72 Stat. 435; 42 U.S.C. 2457).

TECHNICAL FIELD

This invention relates to a device for separating water from a hydrogen-water mixture exhausted from a fuel cell power section. More particularly, this invention relates to such a device wherein water recovered from the device will be substantially free from entrained nondissolved hydrogen, and which operates in a gravity-free or weightless environment such as exists in space.

BACKGROUND ART

Crewed earth orbiting craft derive electrical power from on-board fuel cell power systems. Operation of these fuel cell power systems produces water which is formed by the electrochemical reaction in the fuel cells. The water which is produced by the fuel cell power system is used in the space craft for evaporative cooling of the freon coolant loop in the craft during reentry into the earth's atmosphere and is also consumed by the crew. The water is periodically discharged from the operating fuel cell power systems and stored in one or more water tanks in the craft. One problem which has surfaced in connection with the discharge and subsequent use of fuel cell product water concerns the entrainment of gaseous, undissolved hydrogen in the water. In the gravity-free, weightless environment of space in which the fuel cells operate, hydrogen gas entrained in the product water will remain entrained or dispersed in the water since there is no gravitational force causing the entrained gas to rise to the top of the storage tank on the craft from whence it could be easily vented. It has been found that up to about 25% by volume of the "water" in a storage tank is, in fact, gaseous hydrogen entrained in the water. Thus, instrumentation may indicate that the water storage tank is "full" when, in truth, it is only 75% full of water. This causes problems, one of which relates to the drinking of the gas-water mixture by the crew and an other of which relates to the inability of this type of a mixture to provide the evaporative cooling capacity of pure water. It will be readily apparent that unexpected loss of cooling capability of the craft during reentry can be dangerous.

DISCLOSURE OF INVENTION

This invention provides for simple yet effective removal of hydrogen gases entrained in fuel cell product water before the water reaches the fuel cell water discharge valve, from whence it is expelled into the spacecraft water storage tank or tanks. Thus, substantially gas-free water is fed into the water discharge valve, and thence into the storage tank, from the fuel cell power systems. This invention operates in the weightless environment of space as well as all gravity environments to effectively separate substantially all of the gaseous hydrogen from the product water. The invention utilizes a hydrogen pump/water separator unit which receives a mixture of hydrogen gas and entrained water droplets. Hydrogen gas and water vapor from the fuel cell stack anode exhaust pass through a condenser where the water droplets are formed before reaching the hydrogen pump/water separtor. The water separator portion of the hydrogen pump/water separator includes a mechanical water filter which will allow hydrogen to flow through it to be returned to the fuel stack, but which blocks the flow of water droplets. The blocked water is gathered in a rotating sump which is driven by a motor which also operates the mechanical filters. The water that is collected in the sump will have substantial percentages of undissolved hydrogen gas dispersed in it and it will also have some dissolved hydrogen gas in it. The hydrogen pump/water separator includes a Pitot tube which has an open end which extends into the rotating sump and into the water collected therein whereby water will be transferred from the sump through the Pitot tube to the water discharge valve portion of the hydrogen pump/water separator. While in the Pitot tube, the undissolved hydrogen or entrained gas is bled out of the water through a bleed orifice formed on the inside of a 90° bend in the tube. In the weightless environment, the water pressure in the tube caused by the spinning water supply in the sump being forced into the tube causes the water and gas components of the mixture to layer out at the 90° bend in the tube. The water fraction will layer to the outside of the 90° bend and the gaseous fraction will layer to the inside of the 90° bend. The gas fraction will thus be compressed at the bend by the mixture behind it, and will be expressed through the orifice in the inside of the 90° bend. The bleed orifice opens back into the incoming stream of hydrogen and condensed water droplets. A minor amount of water will also be expressed along with the hydrogen through the bleed orifice. After passing the 90° bend, the degassed water enters a water discharge valve portion of the hydrogen pump/water separator. The water discharge valve is a diaphragm differential pressure valve which periodically empties into the spacecraft water holding tank at the same rate that water is produced in the fuel cell by the electrochemical power generating process.

It is therefore an object of this invention to provide a hydrogen pump/water separator assembly for use in a weightless, gravity-free environment which recovers product water from fuel cell power system exhaust, which water is put to use in a space craft in the weightless environment.

It is a further object of this invention to provide a hydrogen pump/water separator assembly of the character described which removes substantial percentages of gaseous hydrogen from the fuel cell product water before storing the recovered water in a storage tank or tanks on the space craft.

It is an additional object of this invention to provide a hydrogen pump/water separator assembly of the character described wherein the gaseous hydrogen fraction of the recovered product water is easily and efficiently removed despite the fact that the assembly is operating in a weightless environment.

These and other objects and advantages of the invention will become more readily apparent from the following detailed description of a preferred embodiment thereof when taken in conjunction with the accompanying drawings.

BEST MODE FOR CARRYING OUT THE INVENTION

Figure 1:
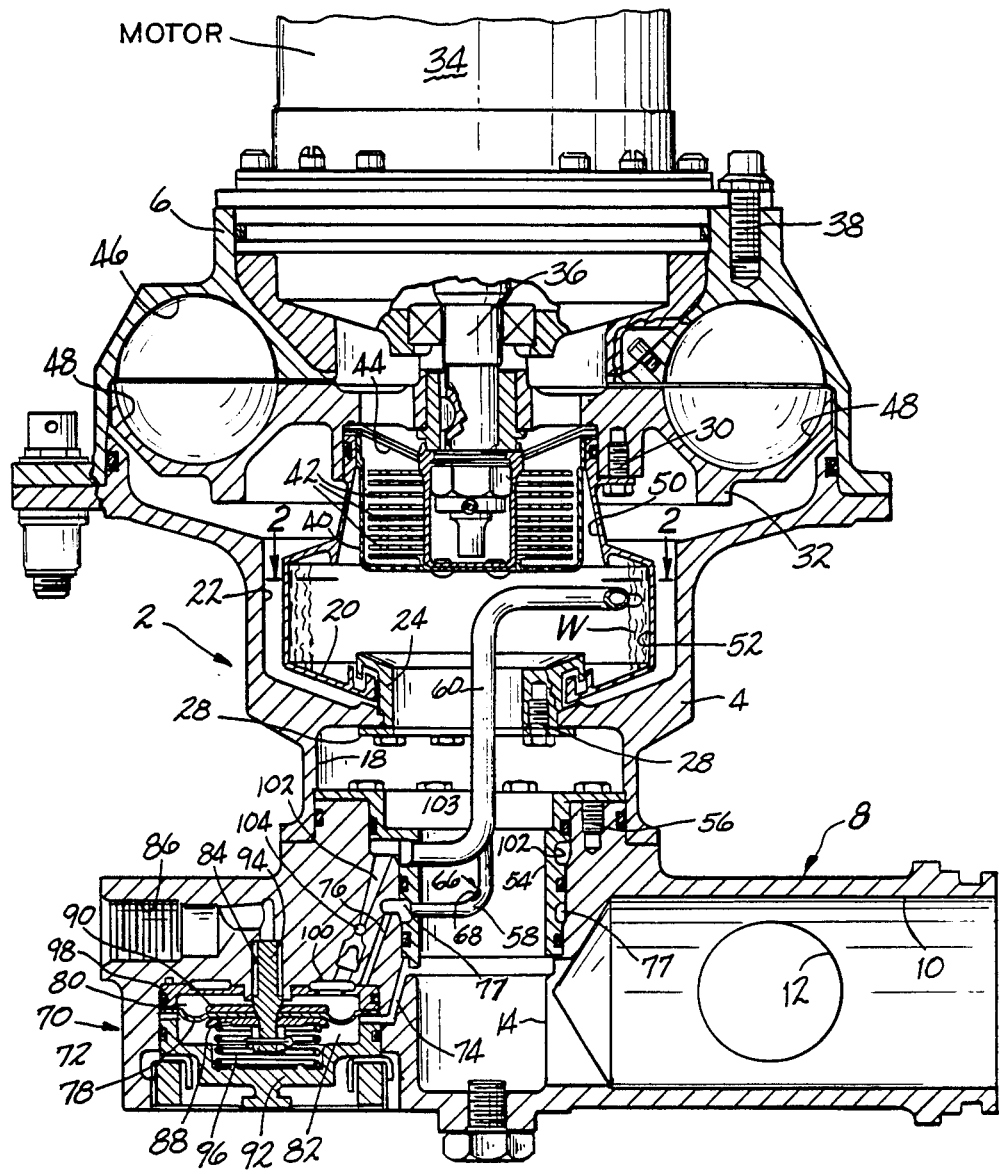
FIG. 1 is an axial sectional view of the hydrogen pump/water separator assembly formed in accordance with this invention.

Referring now to FIG. 1, there is shown a hydrogen pump/water separator assembly formed in accordance with this invention. This assembly, denoted generally by the numeral 2, includes a housing 4 with a cover 6 connected to one end thereof, and a generally tubular feed member 8 connected to the other end of the housing 4. The feed member 8 includes a first axial passage 10 through which a mixture of condensed water droplets in a hydrogen gas stream is fed to the assembly. The mixture comes from a condenser (not shown) which cools and condenses the anode exhaust from the fuel cell stacks (not shown). The opening 12 in the passage 10 receives a temperature sensor which monitors the temperature of the mixture passing through the passage 10 and adjusts the coolant temperature in the condenser as required. The water-gas mixture flows from the passage 10 to a transverse bore 14 which opens into the interior of the housing 4. A rotating sump 20 is mounted in a chamber 22 in the housing 4. The side of the sump 20 opening into the counter bore 18 is rotatably journaled in an annular bearing 24 which is fixed to the housing 4 by an annular mounting plate 26 and bolts 28. The other end of the sump 20 is secured by bolts 30 to a hydrogen collector and pump member 32 mounted in the cover 6.

On the cover 6 there is disposed a motor housing 34 containing a motor which rotatably drives a shaft 36. The shaft 36 is keyed to the collector and pump member 32 so that rotation of the shaft 36 causes concurrent rotation of the collector/pump member 32, and then also the sump 20. It will be understood that the cover 6 does not rotate, and that the motor housing 34 is fixed to the cover 6 by bolts 38. In the end of the sump 20 adjacent to the pump member 32 is a perforated shroud 40, and inside of the shroud 40 there is a stack of perforated annular plates 42. Between the plates 42 and the collector/pump 32 is disposed a fine mesh screen 44. The plates 42 are provided with a plurality of randomly oriented openings, and the shroud 40, plates 42 and screen 44 combine to form a rotating filter through which hydrogen gas from the sump 20 can pass, but through which water droplets and particulate material entrained in the hydrogen gas cannot pass. The hydrogen gas which passes through the screen 44 flows thence through a radial tunnel in the cover 6 into an annular chamber 46 in the cover 6. The concavities 48 are separated hemispherical cups, there being a total of 32 of these cups in the collector/pump 32. The cups 48 take hydrogen from the chamber 46 and deliver the hydrogen to a line (not shown) which returns back to the fuel inlet side of the fuel cell stacks where the recirculated hydrogen will be used to fuel the stacks and to remove water vapor from the stacks.

Figure 2:
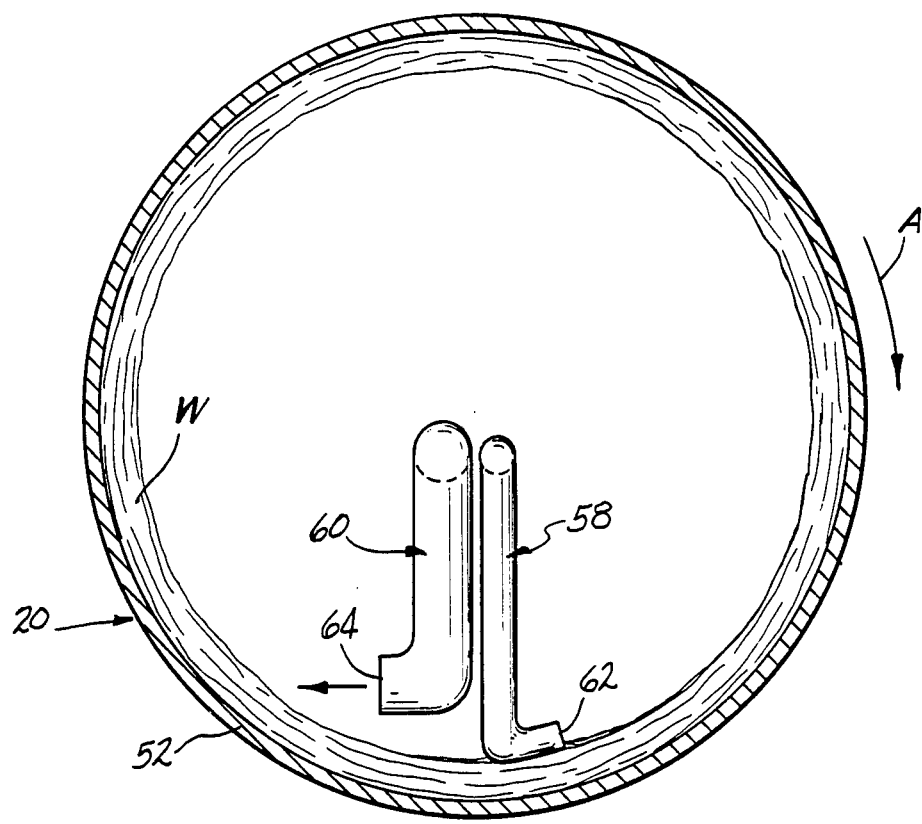
FIG. 2 is a section view taken along line 2—2 of FIG. 1.

Water droplets which are caught on the shroud 40 or disks 42 are flung by centrifugal force outwardly onto the end sloping side wall 50 where they migrate again by centrifugal force into a well portion 52 formed by a coaxial side wall on the sump 20. The water which gathers in the well 52 is held there by centrifugal force and is caused to flow with the well 52 in the direction of rotation of the sump 20. A collar 54 is mounted in the bore 14 and secured to the feed member 18 by bolts 56. The collar 54 carries a pair of open ended tubes, one of which is a water pickup Pitot tube 58, and the other of which is a water discharge tube 60. FIG. 2 shows the relationship between the water W and the open ends of the tubes 58 and 60 which are in the sump 20. The Pitot pickup tube 58 has an open mouth 62 which is partially submerged below the top of the water layer W. The sump 20 is rotating in the direction of the arrow A, as shown in FIG. 2, which means that the water layer W is swept toward the open mouth 62 of the Pitot pickup tube 58. The sump 20 will typically be rotated at a rate of about 8,000 RPM so that a water pressure of about 15 psi will be created in the bore of the Pitot pickup tube 58. The return tube 60 has an open discharge end 64 which is inwardly offset from the water layer W and through which water is returned to the sump 20 as will be explained hereinafter in greater detail. It will be noted that both tubes 58 and 60 have the same general configuration in that both are generally S-shaped. Each has two 90° bends between its open ends. In the inside surface of the 90° bend 66 in the Pitot pickup tube 58, there is drilled a small (on the order of 0.020 inch) bleed orifice 68 through which gaseous hydrogen is bled from the mixture passing through the tube 58 as will be described in greater detail hereinafter.

At the end of the feed member 8 opposite the passage 10 is the water discharge valve portion of the hydrogen pump/water separator 2, the water discharge valve being denoted generally by the numeral 70. The water discharge valve 70 includes a cavity 72, in which the valve mechanism resides. A first passage 74 extends from the bore 14 into the cavity 72 and a second passage 76 extends from the outlet end of the Pitot pickup tube 58 to the cavity 72 via an annular groove 77 in the collar 54. The cavity 72 is divided into two parts by a diaphragm 78, one part 80 being a water storage chamber into which the second passage 76 extends, and the other part 82 being a system pressure sensing chamber into which the first passage 74 extends. A water outlet passage 84 exits from the water storage chamber 80 and communicates with a water tap outlet 86, the latter of which is connected by a tube or the like to a water storage tank on the space craft. The diaphragm 78 is sandwiched between two plates 88 and 90 and the open end of the cavity 72 is closed off by a cap 92. A valve stem 94 is mounted on the plates 88 and 90 and diaphragm 78, the valve stem 94 being biased into the water outlet passage 84 by a spring 96 interposed between the cap 92 and the plate 88. A ring 98 is disposed in the water storage chamber 80 and holds an annular water filter 100 in the chamber 80. An aspirator passage 102 extends from the water storage chamber 80 to the inlet end of the return tube 60 via an annular groove 103 in the collar 54, the mouth of the aspirator passage being covered by the filter 100. The filter 100 prevents particulate material in the water from passing into the aspirator 102 to plug the latter. The aspirator 102 is connected to the water droplet condenser through a passage 104 and serves to aspirate water collected in the condenser into the return tube 60 when the system is under the influence of gravity, as when on a launchpad. There is a second aspirator (not shown) which also opens into the groove 103 and which is also connected to an inlet end of the condenser to aspirate water therefrom when the power plant is inverted during takeoff of the craft.

The hydrogen pump/water separator operates as follows. In the weightless environment of space which the system experiences during flight of the space craft, fuel cell product water condensed in the condenser flows in a hydrogen fuel cell exhaust stream through the passage 10 and into the bore 14. Water droplets are removed from the hydrogen stream by the shroud 40 and plates 42 to migrate by centrifugal force to the outer well 52 of the sump 20. The water is continuously collected therefrom by the Pitot tube 58 and transferred by pressure gradient to the water storage chamber 80. Likewise, water continuously flows from the chamber 80 through the aspirators 102. This continuous flow provides the aspirator suction force. Thus, the water is pumped in a loop through the Pitot tube 58 through the aspirators 102 and back through the return tube 60 to the sump 58. Gaseous hydrogen entrained in the water is forced back into the bore 14 through the bleed hole 68 in the inside of the bend 66 in the Pitot tube 58. Water is thus constantly entering and leaving the chamber 80 through the aforesaid loop. The spring 96 will normally bias the water discharge valve stem 94 into the bore 84. The chamber 82 is pressurized to recirculating hydrogen pressure by the passage 74 so that the spring 96 plus the system pressure act on the diaphragm 78 to keep the chamber 80 closed. When the water pressure in the chamber 80 exceeds a predetermined level, the spring 96 and gas pressure in the chamber 82 are overcome and the valve stem 94 is moved out of the bore 84 so that water can drain out of the pump/separator into the tap outlet 86. This water will be substantially free from entrained gaseous hydrogen, but will have dissolved hydrogen in it. This dissolved hydrogen is removed from the water by a catalytic device in the spacecraft water system. As noted, periodic increases in the water pressure will compress the spring 96 and open the chamber 80 to release water to the tap outlet 86. These water pressure increases occur when the depth of the water on the sump side well 50 exceeds a preset value.

It will be readily appreciated that the hydrogen pump/water separator of this invention operates dependably in a weightless environment, and is able to separate entrained gaseous hydrogen from fuel cell product water even though the hydrogen gas will not by itself coalesce as it would under the influence of gravity. This allows the fuel cell product water to be used in the space craft for consumption by the crew and also for cooling purposes.

Since many changes and variations of the disclosed embodiment of this invention may be made without departing from the inventive concept, it is not intended to limit the invention otherwise than as required by the appended claims.

We claim:

1. For use in conjunction with a fuel cell power system which operates in a weightless environment, an assembly for separating product water and hydrogen from fuel cell exhaust gases, and for pumping the separated hydrogen back to the fuel cell power system, and removing and storing the separated water, said assembly comprising:

(a) a rotationally driven sump having a side well against which product water is centrifugally layered;

(b) passage means for delivering a mixture of condensed water droplets entrained in hydrogen gas from the fuel cell power system exhaust to said sump;

(c) a hydrogen pump for pumping dewatered hydrogen from the sump back to the fuel cell power system;

(d) means interposed between said sump and said hydrogen pump for separating the water droplets from the hydrogen gas, said means for separating allowing hydrogen to flow to said hydrogen pump but blocking water droplets from leaving said sump;

(e) means in said sump adjacent said means for separating operable to transfer water droplets from said means for separating to said sump side well;

(f) a water discharge valve in said assembly and having a chamber operable to store product water and having valve means operable to periodically release the stored product water from said assembly;

(g) first tube means operable to pick up water from adjacent said sump side well and deliver the water to said water valve chamber;

(h) second tube means operable to return water from said water valve chamber to said sump;

(i) first means operable to separate entrained gaseous hydrogen from the water in said first tube means in a weightless environment; and (j) second means in said first tube means operable to bleed the separated gaseous hydrogen from said first tube means in the weightless environment whereby water entering said water discharge valve chamber is substantially free from entrained gaseous hydrogen.

2. The assembly of claim 1 wherein said first means is a substantially right angle bend in said first tube means and wherein said second means is a small orifice in said first tube means on an inner side of said right angle bend.

3. The assembly of claim 2 wherein said small orifice opens into said passage means whereby gaseous hydrogen and small amounts of water are bled from said first tube means directly into said passage means to reenter said sump.

* * * * *